United States Patent [19]

Needham

[11] Patent Number: 5,894,305

[45] Date of Patent: Apr. 13, 1999

[54] METHOD AND APPARATUS FOR DISPLAYING GRAPHICAL MESSAGES

[75] Inventor: Bradford H. Needham, Hillsboro, Oreg.

[73] Assignee: Intel Corporation, Santa Clara, Calif.

[21] Appl. No.: 08/814,578

[22] Filed: Mar. 10, 1997

[51] Int. Cl.$^6$ .................................................. G06F 3/00
[52] U.S. Cl. ........................... 345/329; 395/200.5
[58] Field of Search ........................ 345/329, 330, 345/331, 332, 335; 395/200.3, 200.33, 200.34, 200.35

[56] References Cited

U.S. PATENT DOCUMENTS

| | | | |
|---|---|---|---|
| 5,442,679 | 8/1995 | Regis et al. | 379/34 |
| 5,579,472 | 11/1996 | Keyworth, II et al. | 345/326 |
| 5,680,617 | 10/1997 | Gough et al. | 707/104 |
| 5,751,793 | 5/1998 | Davies et al. | 379/88.11 |

OTHER PUBLICATIONS

Rath, D, "eShare Technologies," Computer Newsletter News, 1997, n 767, p. 116.

Rooney, P., "Microsoft delays release of messaging-server software," PC Week, V10, n23, p.6(1), 1993.

Vaughan–Nichols, S.J., "Connect Time; new CIS message software," Computer Shopper, V13, N5, p. 622(2), 1993.

"Videodraw: A Video Interface for Collaborative Drawing", John C. Tang, Scott L. Minneman, System Sciences Laboratory, Xerox Palo Alto Research Center, CHI '90 Proceedings, 1990.

"Internet Relay Chat Protocol", J. Oikarinen, D. Reed, May 1993.

Primary Examiner—A. Katbab
Attorney, Agent, or Firm—Blakely, Sokoloff, Taylor & Zafman LLP

[57] ABSTRACT

A graphical user interface (GUI) is disclosed. The GUI includes a chronological display that displays graphical messages generated by a plurality of clients connected on a data distribution system.

34 Claims, 8 Drawing Sheets

5,894,305

1

METHOD AND APPARATUS FOR DISPLAYING GRAPHICAL MESSAGES

FIELD OF THE INVENTION

The present invention pertains to the field of graphical communication using computers. More specifically, the present invention relates to graphical communication between multiple parties using computers on a network.

BACKGROUND OF THE INVENTION

Chat room services from Internet service providers and on-line services provide an informal, public meeting place where participants from all over the world can converse in text, in audio, or through a shared white board. Chat rooms may be maintained by a single server or a plurality of servers spread out over a large area, connected by a network.

A typical chat room service relies on two basic components of Transfer Control Protocol/Internet Protocol (TCP/IP), the networking protocol upon which the Internet is based, clients and servers. Clients run software that allow them to connect to a server. The server accepts connections from several clients at the same time. A plurality of servers are interconnected. From one server, a client can access the conferences and users on other servers. The plurality of servers provide the supporting structure that allow the chat room service to work. The servers maintain information on the current available chat rooms. Every time a new room is created, the information about it is passed to every other server on the network. Servers also administer which clients are currently connected and what options and features they have set up. All of this information is exchanged between servers as it is changed. A typical chat system, Internet Relay Chat (IRC), is described in the Internet RFC1459, "Internet Relay Chat Protocol".

Current chat room services offer poor support for non-ASCII characters, making communication in languages other than English, such as ideographic languages, difficult. Furthermore, current chat room services offer poor support for sharing graphical messages among clients.

In the past, some services allowed a plurality of clients to use a shared white board for sending graphical messages between clients. Each client system had a video camera directed to a white board at the client's site. The images captured by the video camera would be sent to a server. The server would superimpose the images received by each of the video cameras upon each other and send the new image to each of the clients to display. One such system, Video Draw at Xerox PARC, is described in *Video Draw: A Video Interface For Collaborative Drawing*, by John C. Tang and Scott L. Minneman, printed in the CHI '90 Conference Proceedings.

The use of a shared white board had several drawbacks. One drawback of using a shared white board is that linear conversation could not be conducted easily through the shared graphical space. When more than two clients shared a white board, it was difficult for one to determine which client was making a contribution to the shared white board and there were difficulties in keeping track of the order when each contribution was made. Another drawback of using a shared white board was that after the white board was filled, clients had to wait for other clients to erase the contents on their white board before further contribution could be made.

Thus, a method and apparatus for improving graphical communication between multiple parties using computers on a network is needed.

2

SUMMARY OF THE INVENTION

A graphical user interface (GUI) is disclosed. The GUI includes a chronological display that displays graphical messages generated by a plurality of clients connected on a data distribution system. According to an alternate embodiment of the present invention, the GUI includes a chronological display that displays graphical messages generated by a first client system executing the GUI and a second client system connected to the first client system on a data distribution system. According to an embodiment of the present invention, the GUI includes a display configuration input that allows a user to select locations on the chronological display where the graphical messages are displayed.

A graphical user interface (GUI) according to a second embodiment of the present invention is disclosed. The GUI includes a first identifier that identifies a first client. A first area of space, next to the first identifier, displays a first graphical message generated by the first client. A second identifier identifies a second client. A second area of space, next to the second identifier, displays a second graphical message generated by the second client.

A computer system is disclosed. The computer system includes a bus. A processor is coupled to the bus. A memory is coupled to the bus. A network interface is coupled to the bus. A graphics input device is coupled to the bus. A display device is coupled to the bus. The display device configures a graphical user interface (GUI). The GUI includes a chronological display that displays graphical messages generated by a plurality of clients connected on a network.

A method for configuring a graphical user interface (GUI) for graphical chat is disclosed. A first graphical message generated from a first client is received. The first graphical message is displayed at a first location on a chronological display. A second graphical message generated from a second client is received after receiving the first graphical message. The first graphical message is displayed at a second location on the chronological display. The second graphical message is displayed at the first location on the chronological display.

DESCRIPTION OF THE DRAWINGS

The present invention is illustrated by way of example and not by way of illustration in the figures of the accompanying drawings, in which like references indicate similar elements and in which.

DETAILED DESCRIPTION

Figure 1:
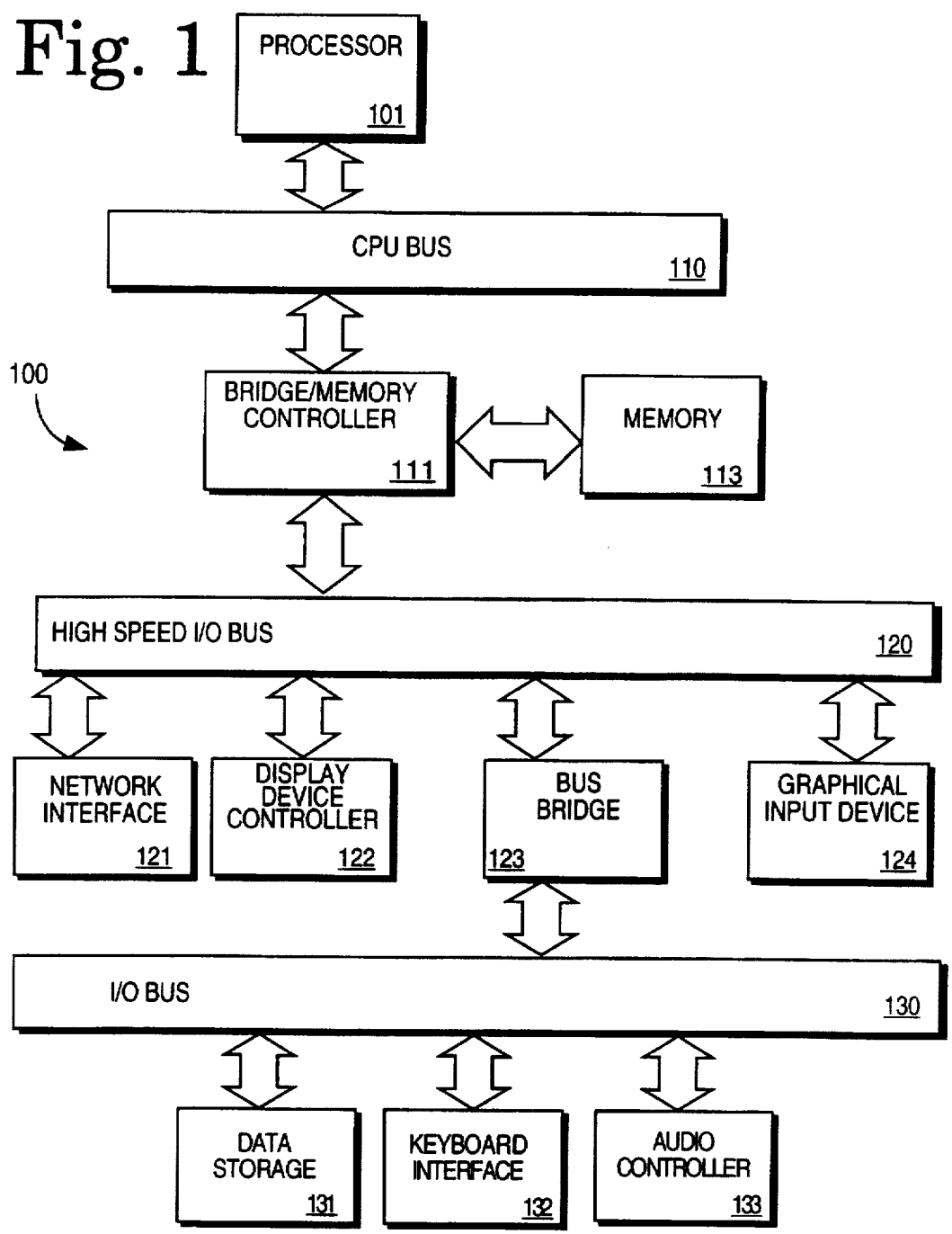
FIG. 1 illustrates a block diagram of a computer system implementing one embodiment of the present invention.

Referring to FIG. 1, an exemplary computer system upon which an embodiment of the present invention can be implemented is shown as 100. The computer system 100 comprises a processor or CPU 101 that processes digital data. The processor 101 can be a complex instruction set computing (CISC) microprocessor, a reduced instruction set computing (RISC) microprocessor, a very long instruction word (VLIW) microprocessor, a processor implementing a combination of instruction sets, or other processor device. The processor 101 is coupled to a CPU bus 110 that transmits signals between the processor 101 and other components in the computer system 100.

For the illustrated embodiment, a memory 113 comprises a dynamic random access memory (DRAM) device, a static random access memory (SRAM) device, or other memory devices. The memory 113 stores information or other intermediate data during execution by the processor 101. A bridge memory controller 111 is coupled to the CPU bus 110 and the memory 113. The bridge memory controller 111 directs data traffic between the processor 101, the memory 113, and other components in the computer system 100 and bridges signals from these components to a high speed I/O bus 120.

For the illustrated embodiment, the high speed I/O bus 120 supports peripherals operating at high data throughput rates. The bus 120 can be a single bus or a combination of multiple buses. As an example, the bus 120 can comprise a Peripheral Components Interconnect (PCI) bus, a Personal Computer Memory Card International Association (PCMCIA) bus, or other buses. The bus 120 provides communication links between components in the computer system 100.

A network interface 121 is coupled to the bus 120. The network interface operates to link computer system 100 to a server or a network of computers and provides communication among the machines. The network interface 121 may be a telephone modem, a cable modem, an Integrated Services Digital Network (ISDN) connection or other interface to a network. A display device controller 122 is coupled to the high speed I/O bus 120. Display device controller 122 is coupled to the bus 120. The display device controller 122 allows coupling of a display device to the computer system and acts as an interface between the display device and the computer system 100. The display device receives information and data from the processor 101 through the display device controller 122 and displays the information and data to the user of the computer system 100. Graphical input device 124 is coupled to the bus 120. The graphical input device 124 operates to input graphical images into the computer system 100. The graphical input device 124 may be, for example, a video camera and white board or an electronic pen and tablet or other graphical input devices.

In the illustrated embodiment, a bus bridge 123 couples the high speed I/O bus 120 to I/O bus 130. The bus bridge 123 comprises a translator to bridge signals between the high speed I/O bus 120 and the I/O bus 130. The I/O bus 130 is used for communicating information between peripheral devices that operate at lower throughput rates. The I/O bus 130 can be a single bus or a combination of multiple buses. As an example, the bus 130 can comprise an Industry Standard Architecture (ISA) bus, an Extended Industry Standard Architecture (EISA) bus or a Micro Channel Architecture (MCA) bus. The bus 130 provides communication links between components in the computer system 100. A data storage device 131 can be a hard disk drive, a floppy disk drive, a CD-ROM device, a flash memory device or other mass storage device. A keyboard interface 132 allows coupling of a keyboard to the computer system and transmits signals from a keyboard to the computer system 100. An audio controller 133 that operates to coordinate the recording and playing of sounds is also coupled to the I/O bus 130.

The present invention is related to the use of the computer system 100 to configure a GUI for graphical communication between multiple parties on a network. According to one embodiment, configuring a GUI for graphical communication is performed by computer system 100 in response to the processor 101 executing sequences of instructions contained in the memory 113. Such instructions may be read into the memory 113 from other computer-readable mediums such as data storage devices 131 or from the network. Execution of the sequences of instructions contained in the memory 113 causes the processor to configure a GUI for graphical communication, as will be described hereafter. In alternate embodiments, hard-wired circuitry may be used in place of or in combination with software instructions to implement the present invention. Thus, the present invention is not limited to any specific combination of hardware circuitry and software.

Figure 2:
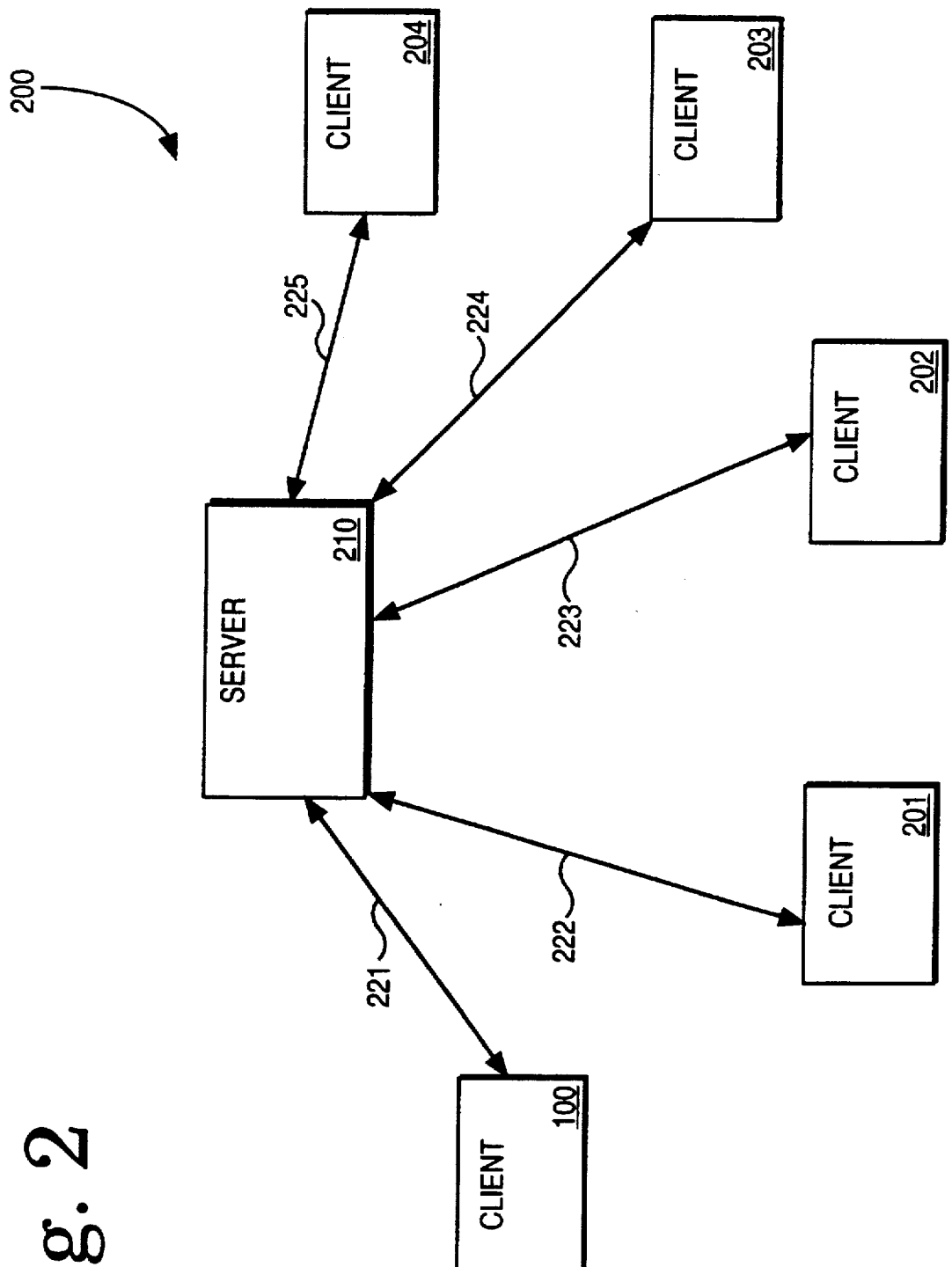
FIG. 2 illustrates a data distribution system implementing an embodiment of the present invention using the uni-cast protocol.

FIG. 2 illustrates a data distribution system implementing an embodiment of the present invention using a uni-cast protocol. Data distribution system 200 is a network comprising a plurality of clients 100, and 201–204. Clients 100, and 201–204 may be implemented by computer systems such as the one described in FIG. 1. The data distribution system 200 also comprises a server 210. Each client maintains a separate connection with the server 210. Lines 221–225 represent the connection between the clients 100, and 201–204 and the server 210, respectively. Connections 221–225 may be, for example, an Internet connection using Transfer Control Protocol (TCP) or User Datagram Protocol (UDP). According to an embodiment of the present invention, a graphical message generated from a client is transmitted to the server 210 in the form of a packet of data via its connection. The graphical message is sent to a queue of messages in the server 210 where other graphical messages from other clients are stored. A copy of the graphical messages received from each of the clients are then transmitted to the clients 100, and 201–204 from the server 210 in the order which they were received. The clients 100, and 201–204 store the graphical messages received from the server 210 in their own queue of received messages. Thus, each client receives a copy of the graphical messages sent to the server 210 in the order that the messages were received by the server 210. The clients 100, and 201–204 display the packets of graphical messages stored in their queue of received messages on a display device.

According to an embodiment of the present invention, server 210 may be connected to a plurality of other servers configured similarly to form a network of servers sharing graphical data. According to still another embodiment of present invention connections 221–225 may be non-Internet connections over a local area network (LAN) or a wide area network (WAN). The server 210 and the clients 100, and 201–204 may be implemented by any known circuitry. It should be appreciated that the data distribution system 200 may be a single computer system with a plurality of clients connected onto the computer system, wherein the plurality of clients use inter-process communication to communicate with one another.

Figure 3:
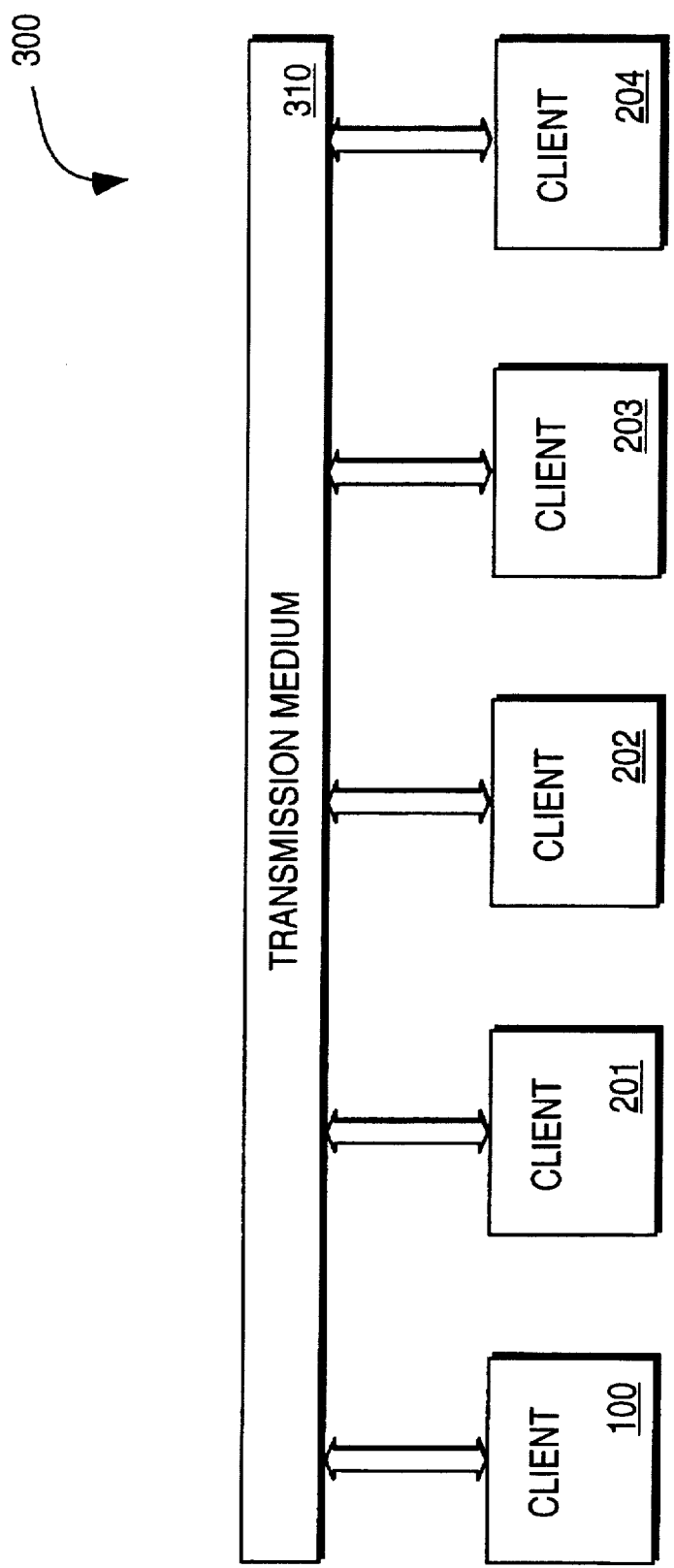
FIG. 3 illustrates a data distribution system implementing an embodiment of the present invention using a multi-cast protocol.

FIG. 3 illustrates a data distribution system implementing an embodiment of the present invention using a multi-cast protocol such as Multicast Internet Protocol. Data distribution system 300 is a network comprising a plurality of clients 100, and 201–204. Clients 100, and 201–204 may be implemented by computer systems such as the one described in FIG. 1. The clients 100, and 201–204 are coupled to transmission medium 310. Transmission medium 310 may be, for example, an Internet network, or a Local Area Network (WAN) or Wide Area Network (WAN). According to an embodiment of the present invention, a first graphical message is transmitted from a first client 100 to a plurality of other clients 201–204 on the data distribution system 300 as a packet of graphical data via transmission medium 310. Each of the clients 100, and 201–204 have a queue of received messages where graphical messages sent from other clients are stored in the order received. The client sending the graphical message, client 100, also stores a copy of the graphical message it sent to the other clients in its queue of received messages. Clients 201–204 also perform a similar protocol when sending graphical messages. Each of the clients 100, and 201–204 display the graphical messages stored in its queue of received messages on a display device.

Figure 4:
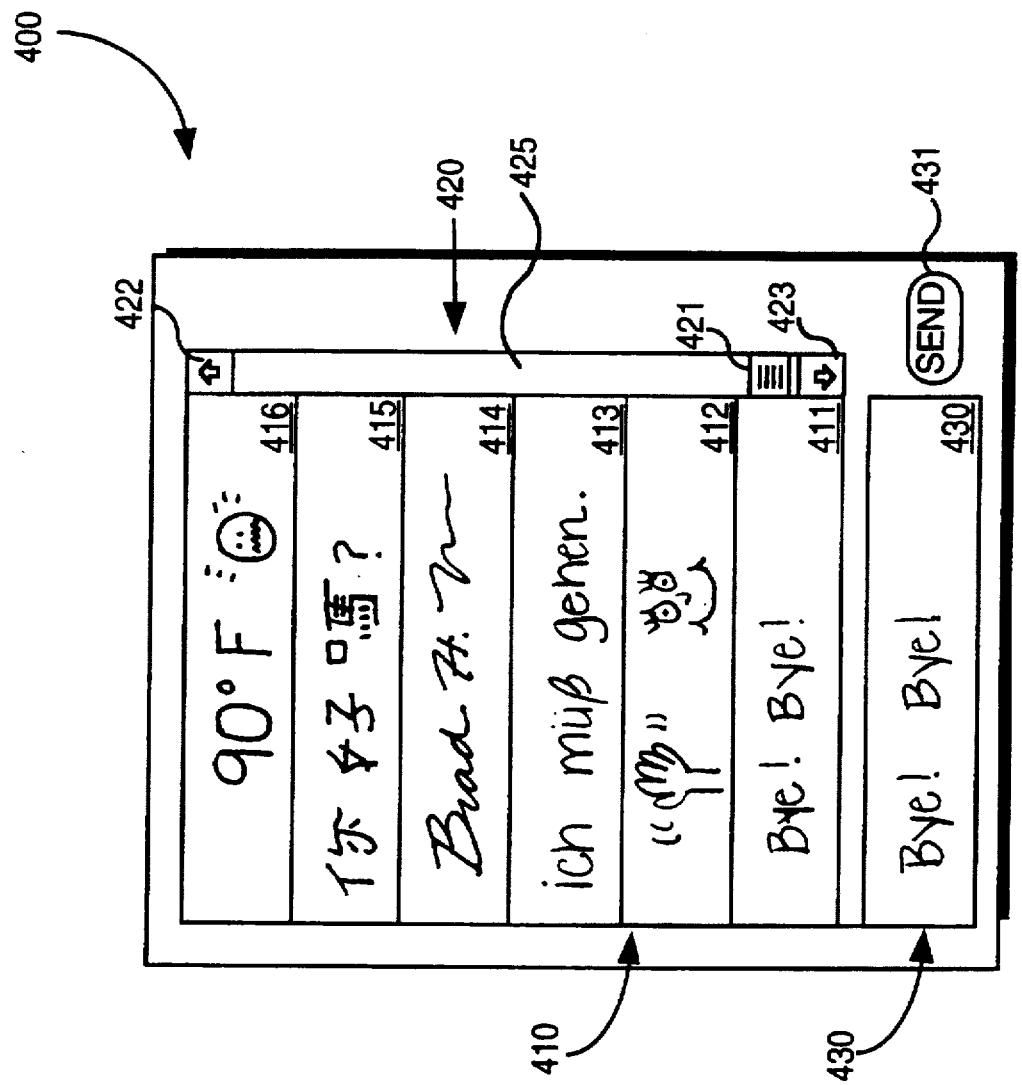
FIG. 4 illustrates a GUI for displaying graphical messages according to an embodiment of the present invention.

Client 100 comprises a GUI for displaying the plurality of graphical messages in its queue of received messages. FIG. 4 illustrates one GUI according to an embodiment of the present invention. The GUI 400 includes a chronological display 410. The chronological display 410 operates to display the graphical messages in the client's queue of received messages. The chronological display 410 comprises a plurality of windows 411–416. Each window is used to display one of the graphical messages in the client's queue of received messages.

According to one embodiment of the present invention, the most recent graphical message taken from the client's queue of received messages is displayed in a first window 411. As a new graphical message is taken from the client's queue of received message, the graphical message previously displayed in the first window 411 is moved to the second window 412. Likewise, the graphical message previously displayed in the second window 412 is moved to a third window 413. As new graphical messages from the client's queue of received messages are displayed on the first window, the plurality of previously displayed messages appear to scroll upward to make room for the new graphical message. Graphical messages previously displayed on the sixth window 416 are not displayed on any window of the chronological display 410 when a new graphical message is displayed in the first window 411. Thus, as new messages are retrieved from the client's queue of received messages previously displayed on the sixth window 416 appear to have scrolled off of the chronological display 410. By displaying and saving the graphical messages in a scrolling linear list format corresponding to the client's queue of received messages, the position of a graphical message in the list corresponds to the order in which graphical message was received.

The GUI 400 also includes a scroll bar 420. Scroll bar 420 operates to direct the chronological display 410 to scroll up or down so that a particular graphical message is displayed on the chronological display 410. The scroll bar has directional inputs 422 and 423. By selecting directional input 422, the directional input 422 directs the chronological display 410 to scroll in an upward direction. By selecting directional input 423, the directional input 423 directs the chronological display 410 to scroll in a downward direction. The directional inputs 422 and 423 may be selected by using a cursor control device, a pen, stylus, or other devices.

Previously displayed graphical messages that have scrolled off may be viewed by scrolling the chronological display upwards. Similarly, graphical messages that are currently being sent can be viewed by scrolling the chronological display downwards.

Scroll bar 420 also includes a position indicator 421. The position indicator 421 moves up and down along a position map 425. The position map 425 corresponds to the position of all the graphical messages that have been displayed on the chronological display 410. Together, the position indicator 421 and position map 425 operate to show the area on the scrolling linear list displayed by windows 411–416. When the windows 411–416 of the chronological display 410 are displaying the most recent graphical messages retrieved from the client's queue of received messages, the position indicator 421 is at the bottom-most position as shown in FIG. 4. When the windows 411–416 of the chronological display 410 are displaying the first several graphical messages retrieved from the client's queue of received messages, the position indicator 421 would be at the top-most position of the position map 425. The position indicator 421 may be used to change the area of the scrolling linear list that is displayed by windows 411–416 by selecting and moving the position indicator 421 to a desired position on the position map 420.

The GUI 410 also includes a graphical input display area 430. The graphical input display area operates to display a graphical message generated by a user of the client 100 as the graphical message would appear on the chronological display 410 when transmitted by the client 100. The graphical message displayed on the graphical input display area 430 may be a graphical message taken from an image captured on a white board, a pen and tablet, or other source. Upon selecting a send button 431, the graphical message displayed on the graphical input display area 430 is transmitted to a server, or other clients.

Figure 5:
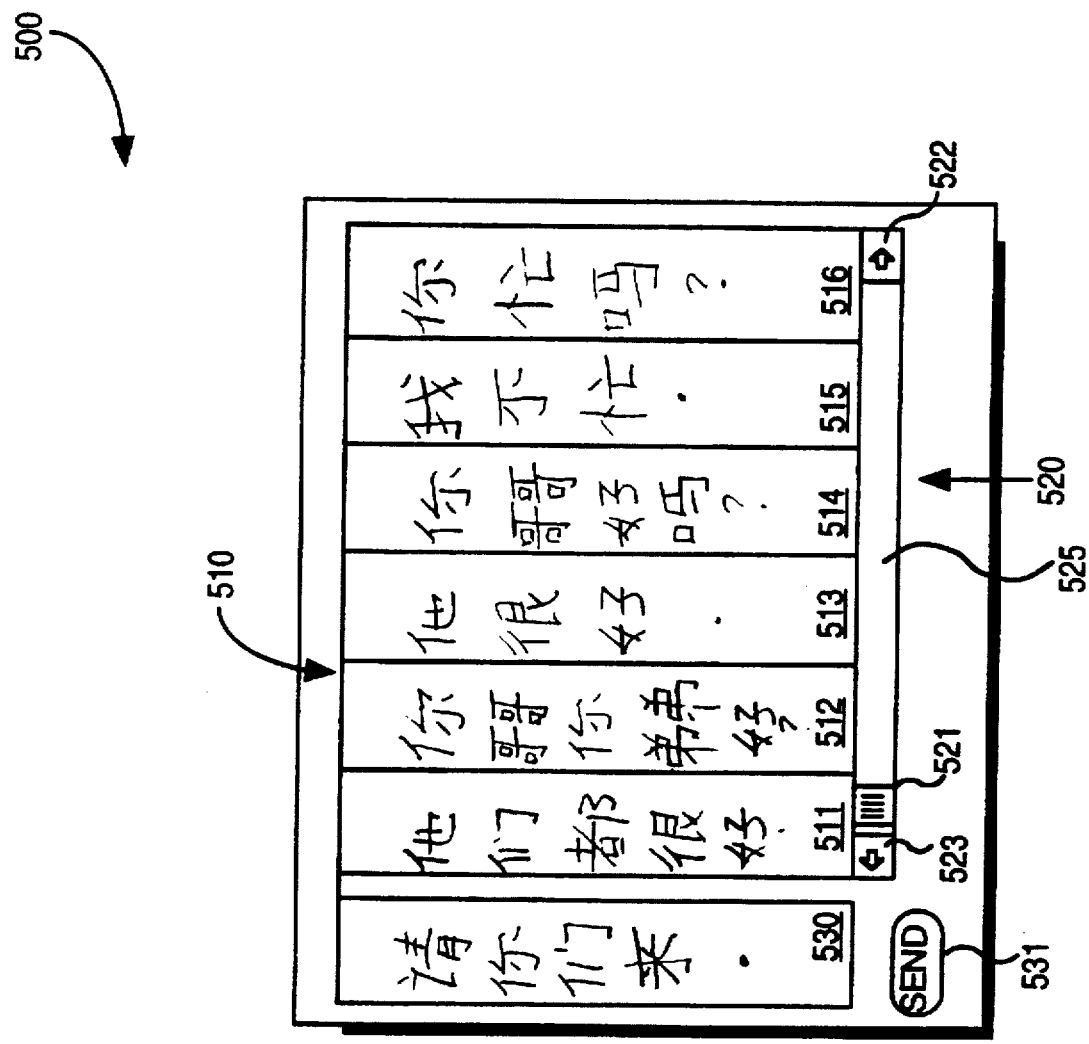
FIG. 5 illustrates a GUI for displaying graphical messages according to a second embodiment of the present invention.

It should be appreciated that the windows 411–416 of the chronological display 410 may be configured to be any size or shape, and that the chronological display 410 may be configured to contain any number of windows. It should also be appreciated that the chronological display 410 may be configured to scroll in any direction. FIG. 5 illustrates a second embodiment of a GUI for displaying graphical messages according to the present invention. The GUI 500 shown in FIG. 5 may be used for ideographic languages which are vertically rather than horizontally oriented.

Similarly to the GUI described in FIG. 4, the GUI 500 includes a chronological display 510 having a plurality of windows 511–516 that display graphical messages in the client's queue of received messages. The most recent graphical message taken from the client's queue of received messages is displayed in a first window 511. As a new graphical message is taken from the client's queue of received messages, the graphical message previously displayed in the first window 511 is moved to the second window 512. Likewise, the graphical message previously displayed in the second window 512 is moved to a third window 513. As new graphical messages from the client's queue of received messages are displayed on the first window 511, the plurality of previously displayed messages appear to scroll to the right to make room for the new graphical message. Graphical messages previously displayed on the sixth window 516 are not displayed on any window of the chronological display 510 when a new graphical message is displayed in the first window 511. Thus, as new messages are retrieved from the client's queue of received messages previously displayed on the sixth window 516 appear to have scrolled off of the chronological display 510.

The GUI 500 also includes a scroll bar 520 with directional inputs 522 and 523, a position indicator 521 and position map 525 that operate similarly to the scroll bar components illustrated in FIG. 4. The GUI 500 also includes a graphical input display area 530 and a send button 531 that display and transmit graphical messages generated by a user of the client 100.

According to an embodiment of the present invention, client 100 may change the configuration of a GUI to orient the chronological display in a preferred manner. A display configuration input allows the client 100 to configure the GUI according to a preference indicated by a user. The display configuration input may be menu driven or be a button that may be selected on the GUI. The chronological display may be re-oriented by selecting locations on the GUI where graphical messages are displayed. Thus, a GUI may be configured to display horizontally oriented graphical messages as illustrated in FIG. 4 or display vertically oriented graphical messages as illustrated in FIG. 5.

Figure 6:
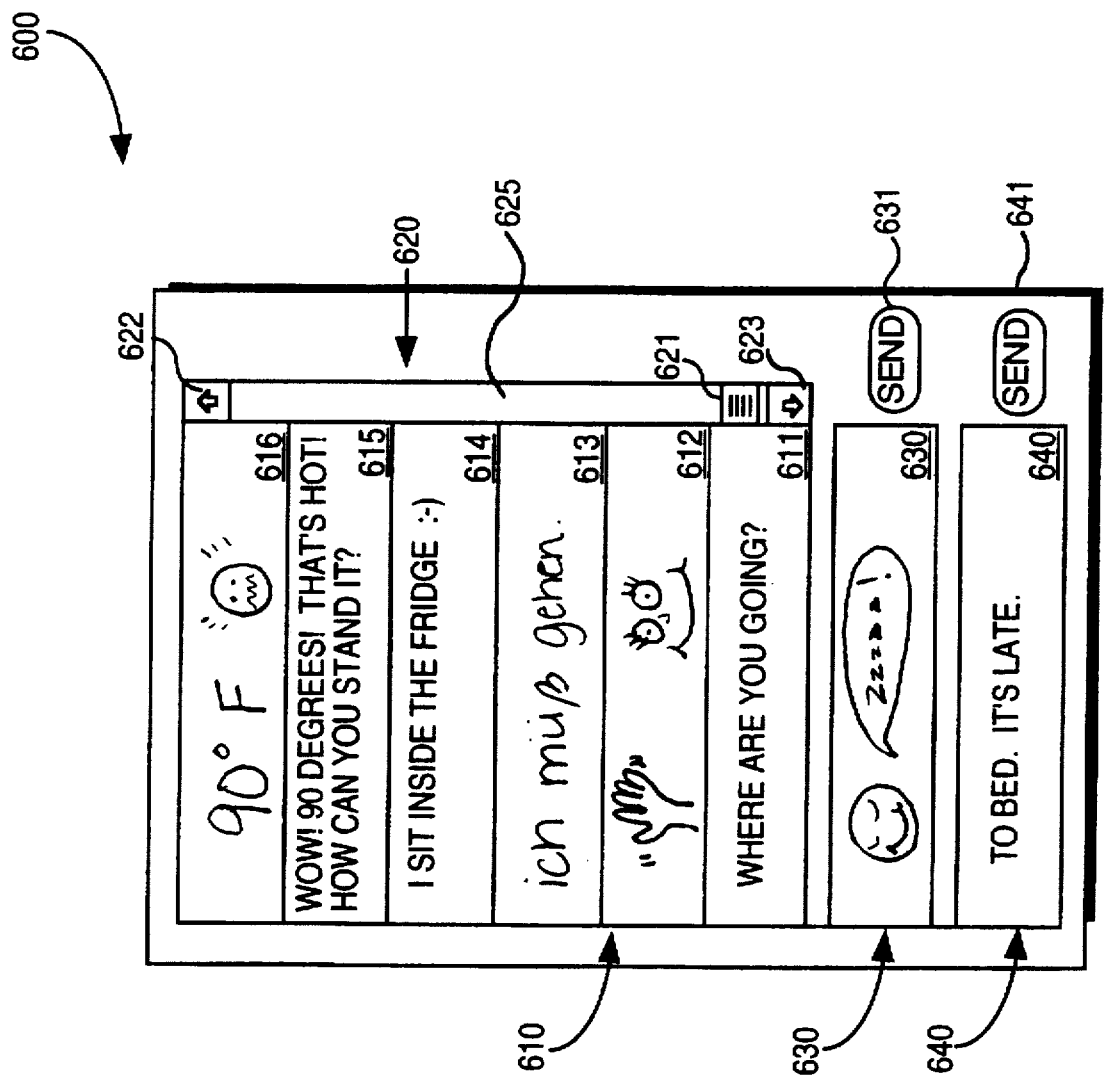
FIG. 6 illustrates a GUI for displaying graphical messages according to a third embodiment of the present invention.

FIG. 6 illustrates a GUI for displaying graphical messages and text messages according to alternate embodiment of the present invention. In this embodiment of the present invention GUI 600 is used to display graphical messages and text messages stored in a client's queue of received messages. It should be appreciated that text messages could be transmitted and received by the clients and servers illustrated in FIGS. 2 and 3 in addition to graphical messages. Thus, the client's received queue contains a mixture of text and graphical messages.

Similarly to the GUI described in FIGS. 4 and 5, the GUI 600 includes a chronological display 610 having a plurality of windows 611–616. The plurality of windows display either graphical messages or text messages in the client's queue of received messages. The most recent graphical or text message taken from the client's queue of received messages is displayed in a first window 611. As a new graphical or text message is taken from the client's queue of received message, the graphical or text message previously displayed in the first window 611 is moved to the second window 612. Likewise, the graphical message previously displayed in the second window 612 is moved to a third window 613. As new graphical or text messages from the client's queue of received messages are displayed on the first window 611, the plurality of previously displayed messages appear to scroll upward to make room for the new graphical message. Graphical or text messages previously displayed on the sixth window 616 are not displayed on any window of the chronological display 610 when a new graphical or text message is displayed in the first window 611. Thus, as new messages are retrieved from the client's queue of received messages previously displayed on the sixth window 616 appear to have scrolled off of the chronological display 610.

The GUI 600 also includes a scroll bar 620 with directional inputs 622 and 623, a position indicator 621 and position map 625 that operate similarly to the scroll bar components illustrated in FIGS. 4 and 5.

The GUI 600 includes a graphical input display area 630 and a send button 631 that display and transmit graphical messages generated by a user of the client 100. The GUI 600 also includes a text input display area 640. The text input display area 640 operates to display a text message generated by a user of the client 100 as the text message would appear on the chronological display 610 when transmitted by the client 100. The text message displayed on the text input display area 640 may be a text message input from a keyboard or other source. Upon selecting a send button 641, the text message displayed on the text input display area 640 is transmitted to a server, or other clients.

According to an embodiment of the present invention, an identifier is placed next to the graphical or text message. The identifier may be a name, an avatar, or other identifying marks corresponding to the user of the client transmitting the graphical or text message.

Figure 7:
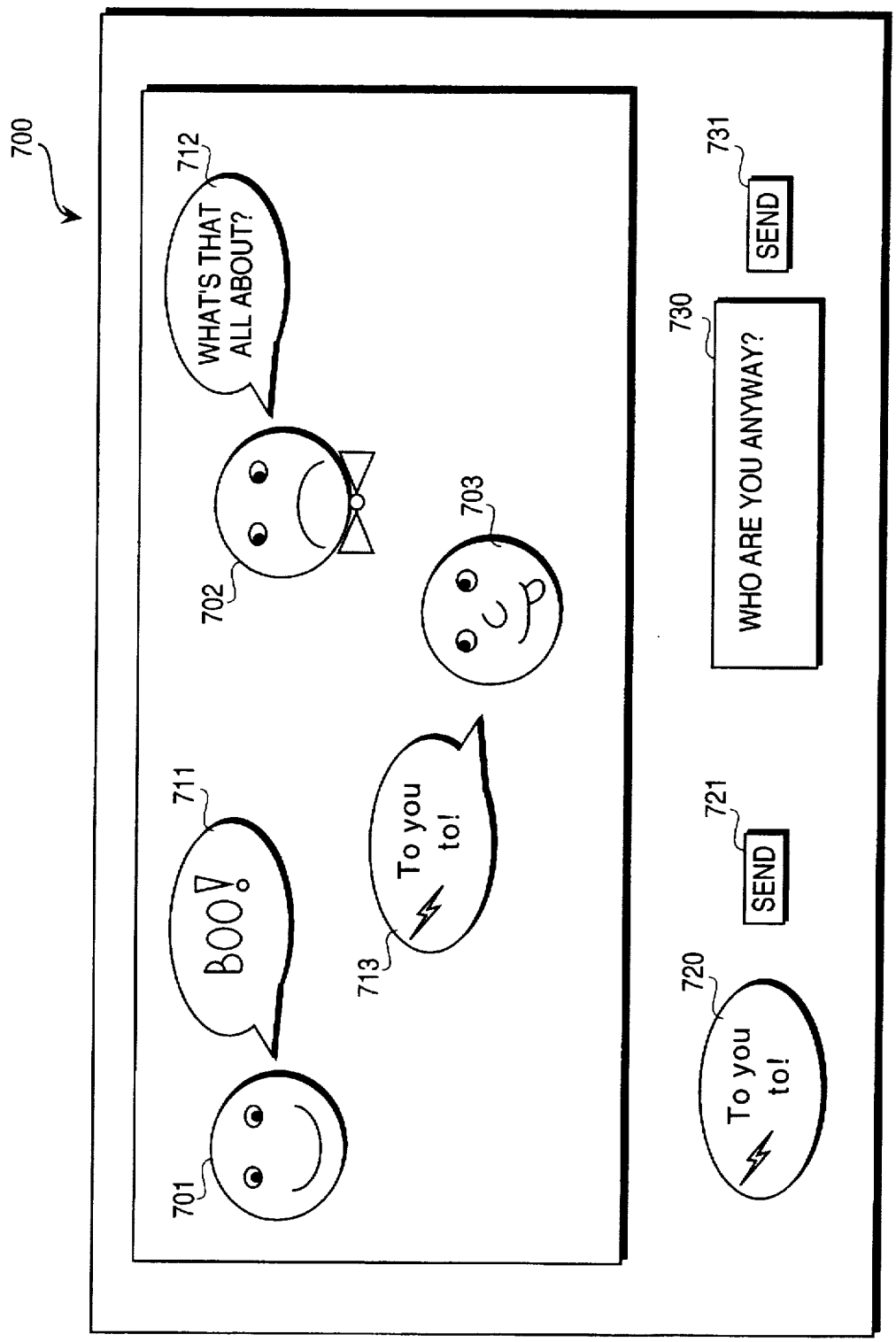
FIG. 7 illustrates a GUI for displaying graphical messages according to a fourth embodiment of the present invention.

FIG. 7 illustrates a GUI for displaying graphical messages according to alternate embodiment of the present invention. The GUI 700 includes a plurality of identifiers 701–703 each identifying a client connected on a network or a user of the client. The identifiers 701–703 may be an avatar of a user of the client, for example. The GUI 700 designates an area of space for each identifier. A first area of space 711 corresponds to the identifier 701. A second area of space 712 corresponds to the identifier 702. A third area of space 713 corresponds to the identifier 703. The areas of spaces display graphical and text messages. The first area of space 711 displays graphical and text messages generated by the first client. The second area of space 712 displays graphical and text messages generated by the second client. The third area of space 713 displays graphical and text messages generated by the third client. According to an embodiment of the present invention, the area of spaces may be speak bubbles directed to their corresponding identifiers.

According to an embodiment of the present invention, GUI 700 further includes a graphical input display area 720 and a text input display area 730. The graphical and text input display areas 720 and 730 operate to display graphical and text messages generated by a user of the client 100 as the messages would appear in the first area of space 711 when transmitted by the client 100. Upon selecting a send button 721 or 731, the graphical or text message displayed on the graphical or text input display area 720 or 730 is transmitted to a server, or other clients.

Figure 8:
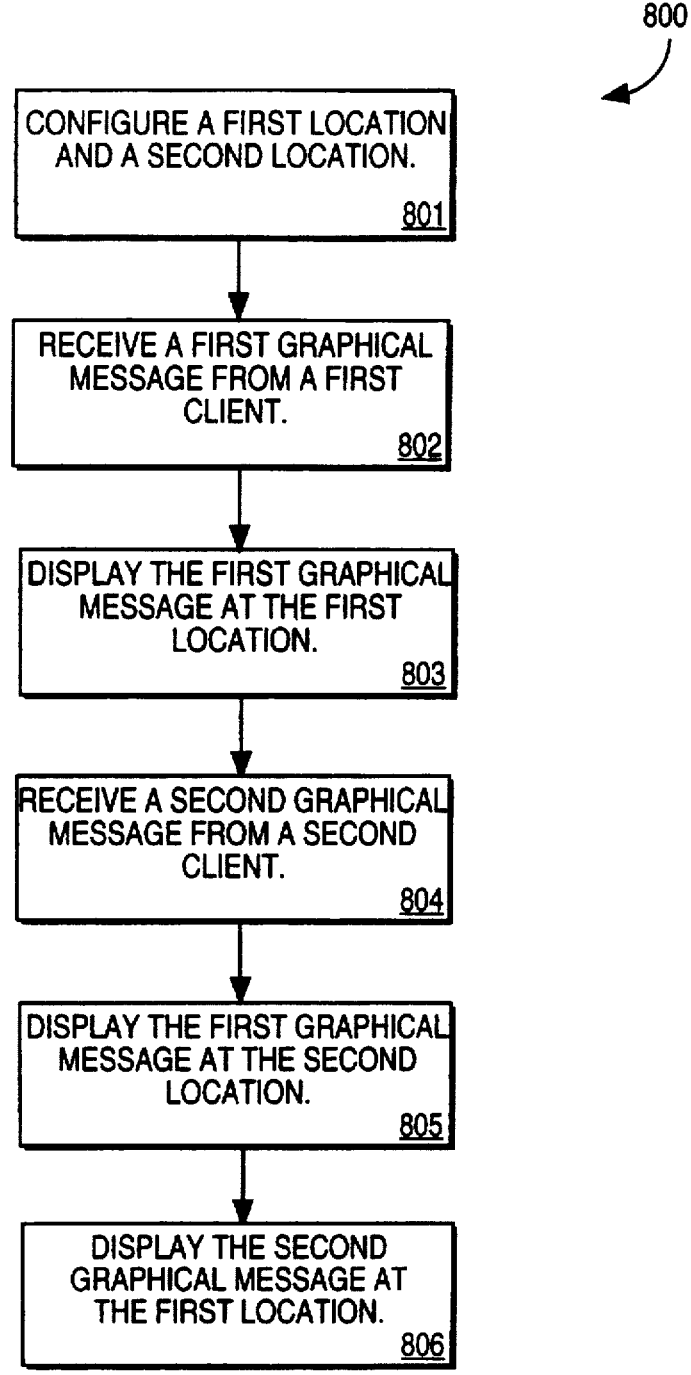
FIG. 8 is a flow chart illustrating a method for configuring a GUI for displaying graphical messages according to an embodiment of the present invention.

FIG. 8 is a flow chart illustrating a method for configuring a GUI for displaying graphical messages. At step 801, a first location and a second location is configured on a chronological display according to data received. The data may be a request to configure the first location and the second location according to the preference of a user of the GUI.

At step 802, a first graphical message generated from a first client is received. According to an embodiment of the present invention, the first client may be the computer system configuring the GUI.

At step 803, the first graphical message is displayed at the first location on the chronological display.

At step 804, a second graphical message generated from a second client is received.

At step 805, the first graphical message is displayed at the second location on the chronological display.

At step 806, the second graphical message is displayed at the first location.

In the foregoing specification, the invention has been described with references to specific embodiments thereof. It will, however be evident that various modifications and changes may be made thereto without departing from the broader spirit and scope of the invention. The specification and drawings are, accordingly, to be regarded in an illustrative rather than restrictive sense.

What is claimed is:

1. A graphical user interface (GUI), comprising:
   a chronological display that displays graphical messages generated by a plurality of clients connected on a data distribution system according to an order that the graphical messages were received.

2. The GUI of claim 1, further comprising a display configuration input that allows a user to select locations on the chronological display where the graphical messages are displayed.

3. The GUI of claim 1, wherein the chronological display is a scrolling linear list.

4. The GUI of claim 3, further comprising a scroll bar that allows a user to input a direction to scroll the scrolling linear list.

5. The GUI of claim 1, further comprising a first input display that displays a first graphical message that is currently generated by a first client system executing the GUI.

6. The GUI of claim 1, wherein the data distribution system is configured to distribute data using a uni-cast protocol.

7. The GUI of claim 1, wherein the data distribution system is configured to distribute data using a multi-cast protocol.

8. The GUI of claim 1, wherein the graphical messages have corresponding identifiers identifying the plurality of clients generating the graphical messages.

9. The GUI of claim 1, wherein the chronological display also displays text messages generated by the plurality of clients connected to the data distribution system.

10. The GUI of claim 9, further comprising a second input display that displays a first text message that is currently generated by a first client system executing the GUI.

11. A graphical user interface (GUI), comprising:
a chronological display that displays graphical messages generated by a first client system executing the GUI and a second client system connected to the first client system on a data distribution system according to an order the graphical messages were received.

12. The GUI of claim 11, further comprising a display configuration input that allows a user to select locations on the chronological display where the graphical messages are displayed.

13. The GUI of claim 11, wherein the chronological display is a scrolling linear list.

14. The GUI of claim 13, further comprising a scroll bar that allows a user to input a direction to scroll the scrolling linear list.

15. The GUI of claim 11, further comprising an input display displaying a first graphical message that is currently generated by the first client system.

16. The GUI of claim 11, wherein the graphical messages have corresponding identifiers identifying the plurality of clients generating the graphical messages.

17. A graphical user interface (GUI), comprising
a first identifier that identifies a first client;
a first area of space, next to the first identifier, that displays a first graphical message generated by the first client;
a second identifier that identifies a second client; and
a second area of space, next to the second identifier, that displays a second graphical message generated by the second client.

18. The GUI of claim 17, wherein the first identifier is a first avatar.

19. The GUI of claim 17, wherein the first area of space is a speak bubble directed to the first avatar.

20. The GUI of claim 17, further comprising a graphical input display that displays graphical messages currently generated by the first client system executing the GUI.

21. The GUI of claim 17, wherein the first area of space displays a text message generated by the first client.

22. The GUI of claim 17, further comprising a text input display that displays text messages currently generated by the first client system executing the GUI.

23. A computer system, comprising:
a bus;
a processor coupled to the bus;
a memory coupled to the bus;
a network interface coupled to the bus;
a graphics input device coupled to the bus;
a display device, coupled to the bus, that configures a graphical user interface (GUI), comprising a chronological display that displays graphical messages generated by a plurality of clients connected on a data distribution system according to an order the graphical messages were received.

24. The computer system of claim 23, wherein the chronological display is a scrolling linear list.

25. The computer system of claim 24, further comprising a display configuration input that allows a user to select locations on the chronological display where the graphical messages are displayed.

26. The computer system of claim 23, further comprising an input display displaying a first graphical message that is currently generated by the computer system.

27. The computer system of claim 23, wherein the graphics input device comprises a drawing board and a video camera.

28. The computer system of claim 23, wherein the graphics input device comprises a digital pen and tablet.

29. A method for configuring a graphical user interface (GUI) for displaying graphical messages, comprising:
receiving a first graphical message generated from a first client;
displaying the first graphical message at a first location on a chronological display;
receiving a second graphical message generated from a second client after receiving the first graphical message;
displaying the first graphical message at a second location on the chronological display; and
displaying the second graphical message at the first location on the chronological display.

30. The method of claim 29, further comprising:
receiving a request to display a previously received graphical message;
displaying the first graphical message at the first location on the chronological display; and
displaying a third graphical message received prior to receiving the first graphical message at the second location on the chronological display.

31. The method of claim 29, further comprising:
receiving a request to configure the chronological display in a preferred orientation;
configuring the first location and the second location on the chronological display according to the preferred orientation.

32. A computer-readable medium having stored thereon sequences of instructions, the sequences of instructions including instructions which, when executed by a processor, causes the processor to perform the steps of:
receiving a first graphical message generated from a first client;

displaying the first graphical message at a first location on a chronological display;

receiving a second graphical message generated from a second client after receiving the first graphical message;

displaying the first graphical message at a second location on the chronological display; and displaying the second graphical message at the first location on the chronological display.

33. The computer-readable medium of claim 32, further comprising instructions which, when executed by the processor, causes the processor to perform the steps of:

receiving a request to display a previously received graphical message;

displaying the first graphical message at the first location on the chronological display; and displaying a third graphical message received prior to receiving the first graphical message at the second location on the chronological display.

34. The computer-readable medium of claim 32, further comprising instructions which, when executed by the processor, causes the processor to perform the steps of:

receiving a request to configure the chronological display in a preferred orientation;

configuring the first location and the second location on the chronological display according to the preferred orientation.

* * * * *